United States Patent [19]
Gazda et al.

[11] 3,916,488
[45] Nov. 4, 1975

[54] POLY-POLYMER PLASTIC DEVICE

[75] Inventors: Chester T. Gazda, Chicopee; James M. Lalikos, Springfield, both of Mass.

[73] Assignee: Titeflex, Springfield, Mass.

[22] Filed: July 22, 1974

[21] Appl. No.: 490,393

Related U.S. Application Data

[63] Continuation-in-part of Ser. No. 262,761, June 14, 1972.

[52] U.S. Cl. .......... 24/262 R; 106/15 FP; 248/74 B
[51] Int. Cl.² ... A44B 21/00; C09D 5/18; F16L 3/08
[58] Field of Search ......... 24/81 CC, 73 SA, 262 R; 5/355, 354, 334 R; 106/15 FP; 248/74 A, 74 B

[56] References Cited
UNITED STATES PATENTS

| | | | |
|---|---|---|---|
| 1,760,323 | 5/1930 | Shelton | 24/81 CC |
| 2,331,258 | 10/1943 | White et al. | 248/74 B X |
| 2,709,558 | 5/1955 | Young | 248/74 B |
| 2,720,269 | 10/1955 | Diacos | 5/334 R UX |
| 2,922,733 | 1/1960 | Henning | 248/74 B X |
| 2,923,760 | 2/1960 | Famely | 248/74 B X |
| 2,987,284 | 6/1961 | Ushkaritys | 248/74 B |
| 3,139,253 | 6/1964 | Crawford et al. | 248/74 B |
| 3,668,302 | 6/1972 | Boland et al. | 106/15 FP X |
| 3,671,487 | 6/1972 | Abolins | 106/15 FP X |

*Primary Examiner*—Donald A. Griffin

[57] ABSTRACT

An admixture of silicone polymer is mixed with granulated polytetrafluoroethylene (TFE) (or related fluoroplastic material) particles in the general order of 0.001 inch – 0.015 inch in diameter grains. The admixture of silicone polymer and TFE is in the range of 25% to 75% by weight of TFE. According to an embodiment of the invention, the poly-polymer material is formed into cushions for covering a metal clamp. In one form, the poly-polymer material is formed into rectangular tubes which may be slipped on over a metal clamp. In another form, the material is vulcanized on to the metal clamp. The described clamp is exemplary of many devices.

21 Claims, 18 Drawing Figures

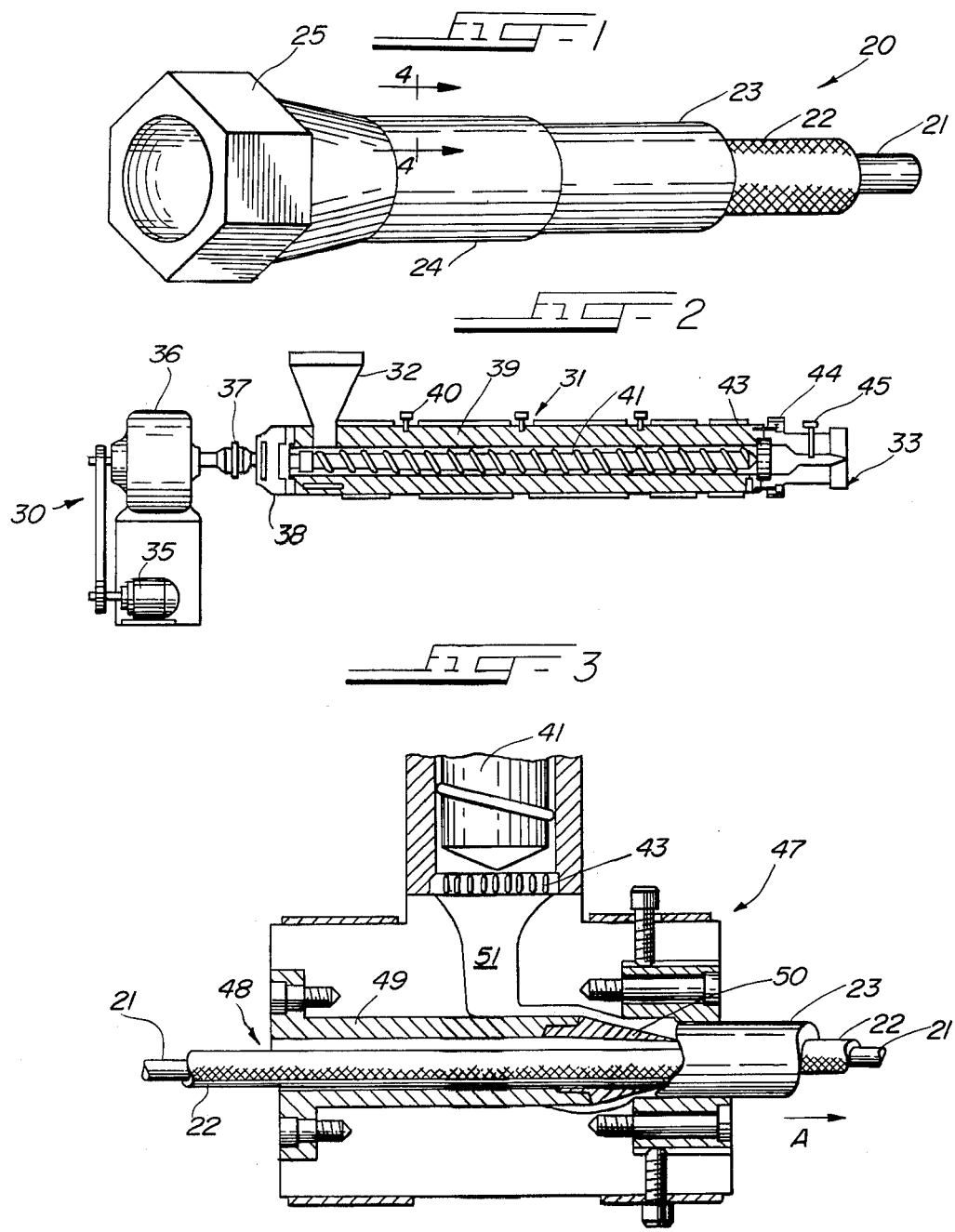

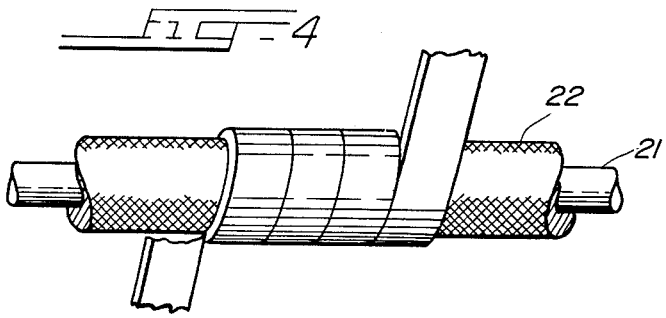
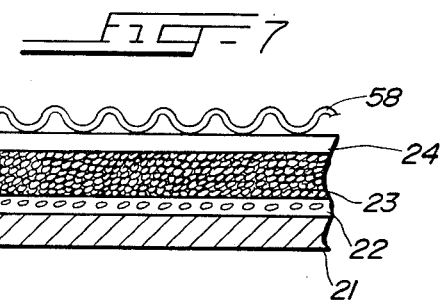
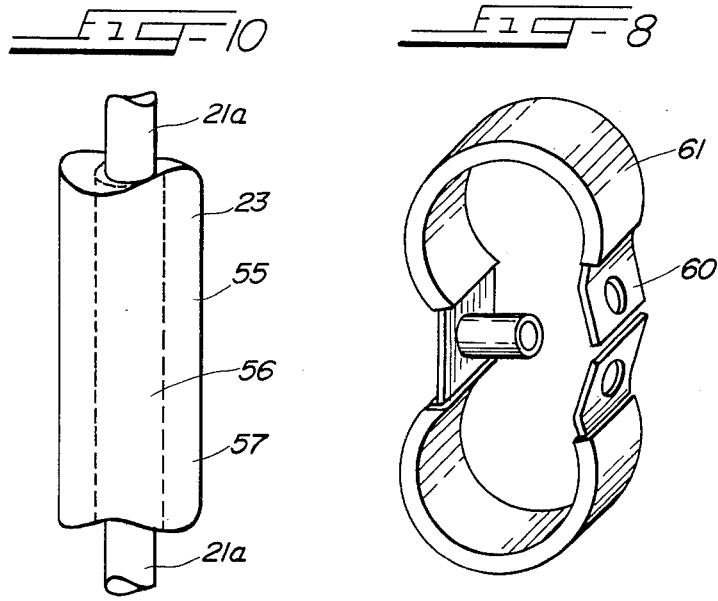
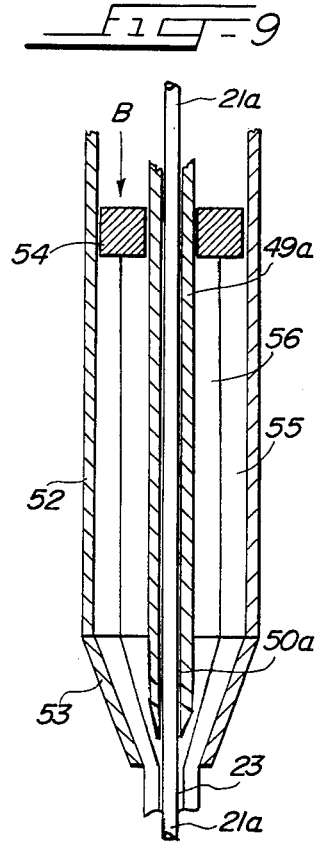

POLY-POLYMER PLASTIC DEVICE

This is a continuation-in-part of our earlier copending application Ser. No. 262,761, filed June 14, 1972.

This invention relates to a composite material made from TFE (or a related fluoroplastic material) mixed with a silicone polymer (or similar material) which may be used especially — although not exclusively — to fabricate cushioned clamps or the like and, more particularly, to clamps for securing tubing, hose, wiring and similar assemblies into high performance aircraft.

Tubing, hoses, clamps, and other similar products used on high performance aircraft demand special characteristics. To enumerate a few, the material should provide volume insulation for high temperature, and should be abrasion resistant in use. It should also have a low stick or slippery surface characterized by chemical inertness, flame resistance, high ablative characteristics, high dielectric properties, flexibility over a wide temperature range, a high strength-to-weight ratio, toughness, structural strength, and low permeability to moisture and vapors. Still other characteristics will readily occur to those who are skilled in the art.

These characteristics are exhibited by polytetrafluoroethylene (TFE), fluoroantedethylene-propylene (FEP), and similar plastics. However, these materials are sometimes difficult to work since they do not readily melt or flow. Thus, the problem is to find ways of working materials having the characteristics of TFE, FEP, or the equivalent. One approach is to provide a mixture of materials including TFE or FEP which can be worked, and yet retain the desired characteristics of TFE, FEP, or the equivalent.

When the mixture of materials is used on high performance aircraft, it must display all of the above described characteristics. In addition, when used to clamp tubes, hoses or wires into such aircraft, it must also have high reliability so that it will not chafe them to cause a leak or short circuit after many hours of flight and vibration. This is important since these hoses are often filled with extremely volatile fuels which might leak during flight, with high speed maneuvering at very high altitudes.

The described clamps are but one exemplary device in a family of devices having cushioned surfaces.

Accordingly, an object of this invention is to provide new and improved materials, especially materials which may be used to manufacture devices in the class of cushioned clamps for tubes, hoses, or wiring assemblies, or the like. Here, an object is to provide all of the characteristics demanded of such clamps or similar devices, especially for high performance aircraft. In particular, an object is to provide a clamp or similar device having an abrasion resistant cushion surface.

Another object of this invention is to provide a TFE or FEP combination material which is easy to work.

In keeping with an aspect of the invention, these and other objects of the invention are accomplished by an aggregate admixture of a base silicone polymer rubber mixed with granulated sintered TFE or FEP. The entire mixture may be extruded into sheets or around a mandrel to provide a form, preferably rectangular in cross-section, or a particular cushion form. Alternatively, the mixture may be either molded or compressed into a shape which is suitable for use in any desired form. This material serves as a scuff coat or cushion on a clamp or similar device. This cushion may be applied over and vulcanized to the associated metal of the clamp; or, when molding or compression is used, a superior bonding is produced between the inventive material and associated metal or other structures. Also, the cushion is denser and more durable.

The clamp described herein provides a concrete example of an exemplary use of the inventive material. Also, the inventive material is described in connection with a metallic bracket for holding a hose in a secure position inside a high performance aircraft. Moreover, the term "performed" is used hereinafter to cover extrusion, molding, compressing, or the like. However, these references to these specific devices and terminology should not be taken as limiting upon the invention. Quite to the contrary, the inventive material may be used for making any of many suitable devices.

Preferred embodiments for accomplishing these and other objects may become more apparent from a study of the attached drawings wherein:

FIG. 1 is a stylized presentation, in perspective, of an exemplary aircraft hose made of the inventive material and by the inventive process;

FIG. 2 is a schematic and symbolic representation of an extruder;

FIG. 3 shows, in perspective, a portion of a crosshead die suitable for use with the machine of FIG. 2 illustrating one way of manufacturing the inventive hose;

FIGS. 4, 5 and 6 show three alternative embodimemts of an ablative volume coating for the inventive hose;

FIG. 7 is a cross-sectional view of the hose of FIG. 1, taken along line 4—4 thereof;

FIG. 8 shows, in perspective, a clamp having a cushion made of the inventive material, with the cushion made in the form of a tube having a rectangular cross-section, made by extrusion, molding, compressing, or the like, which cushion may be slipped over a blank metal strap;

FIG. 9 is a stylized cross-sectional view of a ram extruder for applying a coating with a plural strata having a color coding;

FIG. 10 is a schematic representation of the material extruded by the device of FIG. 9;

Figure 11:
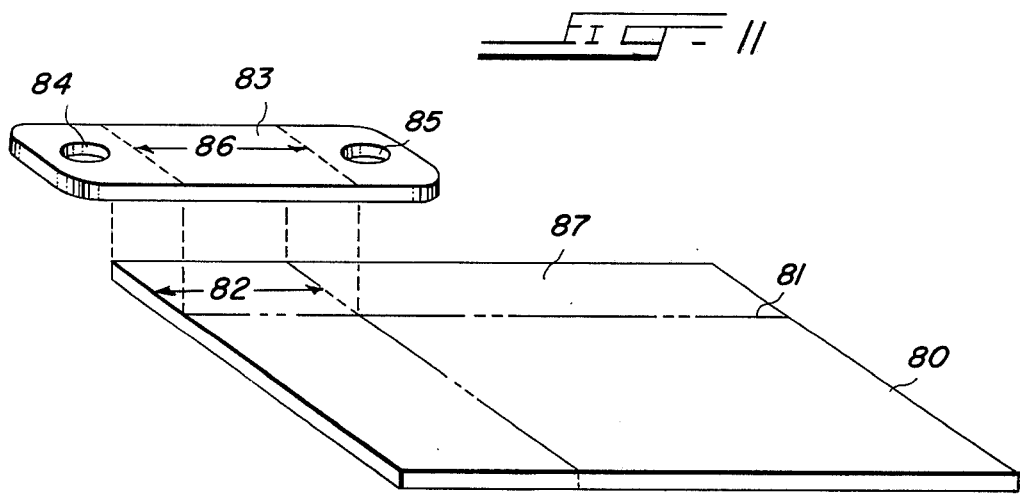
FIG. 11 is a perspective view of a strap blank or metal clamp form and a sheet of the inventive poly-polymeric material, formed as a first step in the inventive process for making a clamp.
Figure 12:
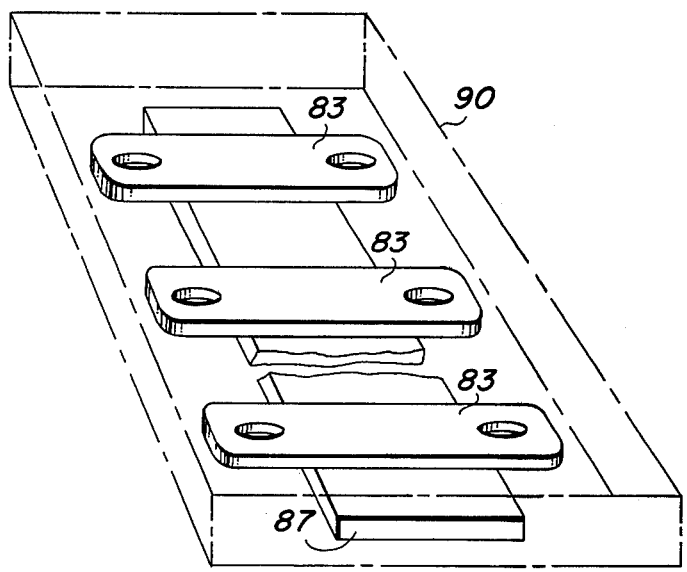
FIG. 12 shows a second step in the manufacturing process wherein a plurality of metal clamp forms are simultaneously vulcanized to a sheet of the inventive material.

An exemplary hose 20 of FIG. 1 comprises a "Teflon" or TFE tube 21, having an outer covering, here shown as comprising a metal braid 22, a preformed scuff coat, flame protective coating 23, and an optional scuff jacket or coating 24. Any suitable metal fitting 25, of known design, may be attached to the end of the hose. The "Teflon" tube 21 might contain a material (fluid or gas) conveyed by the hose. It might also contain electrical wires or any other suitable devices or material. In any event, the characteristics of the "Teflon" tube (or the equivalent) are those required to reliably contain the enclosed and conveyed material. Electrically conductive TFE hose or tubing may be used wherein the inner surface of said tubing contains carbon particles or other electrically conductive materials, such as aluminum, copper, silver and the like.

The braid 22 may be made from any suitable material, such as stainless steel, for example. Such stainless steel is very strong, and since it is an electrical conductor, it may be used to ground the hose and other things connected thereto. This conductivity is important in most aircraft hose, where a fire might result from an inadequate grounding. Alternatively, for hoses in which such conductivity is not desired, the braid may be a dacron or a nylong, such as a product of the DuPont Company sold under the trademark "NOMEX."

The "Teflon" tube 21 and stainless steel braid 22 are cited here by way of example only. Any other suitable material may also be used, depending upon the intended purpose of the end product.

The extruded scuff coat, flame protective material 23 is preferably an admixture of a silicone polymer rubber or polyvinylidine fluoride ($VF_2$), mixed with granulated particles of TFE, FEP, or the equivalent. In one exemplary material actually used with good results, the granules may be in the range from about 0.005 to 0.075 inch in diameter; although the preferred range is in the order of 0.001 to 0.015 inch in diameter. However, for other desired effects the granules may be made either larger or smaller. These two materials are preferably mixed in the proportional range of 25% to 75% by weight, for either material, namely, the TFE or the silicone rubber compound, respectively. We have found that the inventive material composition may vary using (TFE) up to about 75% by weight and the binding adherent material, namely the silicone rubber compound, making up the remainder at about 25% by weight. The variation in percentages depends upon the adherent combination and the ablative characteristic properties.

The silicone rubber or polyvinylidine fluoride ($VF_2$) are preferred for this mixture because of their properties which are particularly desirable for use in high performance aircraft. Silicone rubber compounds are generally classified as organo polysiloxanes and divided into two basic types. The conventional stocks, which are similar in plasticity to organic rubbers, are designed for molding, extrusion, or calendering followed by thermal curing or vulcanization. The other type, namely those compounds identified as room temperature vulcanizing (RTV) rubbers are of lower viscosity and are converted into elastomers at room temperatures using a catalyst. The most important single one of these properties is silicone's reaction to burning. The silicone chars immediately, and the char becomes a heat refractory, highly resistant to further burning. The char is brittle, and the hose must be replaced, but meanwhile, it contains the fire and protects the aircraft.

Silicone or polyvinylidine fluoride ($VF_2$) are especially attractive at elevated temperatures where the change in strength is slight. Moreover, these materials do not become stiff at low temperatures. This makes them particularly suitable for use in aircraft where a wide range of environments exist. More particularly, the outstanding characteristics of these materials are: (1) thermal and oxidative stability at high temperatures, especially at 500° F. and above; (2) flexibility at temperatures below minus 100° F.; (3) excellent electrical insulation properties including resistance to corona breakdown; (4) general inertness and resistance to weathering, ozone, and many chemicals; (5) non-corrosive toward other materials; (6) non-flammability and self-extinguishing in case a fire should start; and (7) surface properties which prevent other materials from sticking thereto. Also, the low surface tension of the silicone fluids enables a thin film to be rapidly and completely distributed over all parts of a mold; therefore, the silicone is easy to work.

At elevated temperatures, silicone or polyvinylidine fluoride ($VF_2$) have a higher strength-to-weight ratio than do many metals, and silicone retains much of its physical strength after prolonged exposure to these high temperatures. The outstanding electrical properties of these materials are relatively unaffected by exposure to heat or to water vapor. A table of typical properties is as follows:

| | |
|---|---|
| Density, lb./cu. in. | 0.070–.075 |
| Compressive strength, psi | 1200–1400 |
| Tensile strength, psi | 400–440 |
| Elongation, % | 8–10 |
| Linear coefficient of expansion, in./in./°F. | 0.000016 |
| Water absorption, % 1 week soak at RT | Under 0.5 |
| Abrasion resistance, Taber (H-10 wheel, 100 gram weight, 1000 revolutions) Weight loss, gr. | 0.22 |
| Weather resistance | Excellent |
| Mild alkali resistance | Excellent |
| Salt resistance | Excellent |
| Acid resistance | Good |
| Oil resistance | Good. |

The TFE or FEP were selected for the mixture because of their outstanding characteristics. More particularly, fluoroplastics, manufactured from a copolymer of tetrafluoroethylene and hexafluoropropylene, have outstanding chemical, thermal, electrical, and physical characteristics. In addition, they offer fabricating advantages. By order of decreasing fluorine substitution and increasing processability, these materials include polytetrafluoroethylene (TFE); fluorinated ethylene-propylene (FEP); and chlorotrifluoroethylene (CTFE). Also available are several copolymers of halogenated and fluorinated hydrocarbons, including fluorinated elastomers.

Many of the desired characteristics and properties of fluoroplastics can be explained by considering their structure. The carbon atoms form a straight chain that is entirely and symmetrically surrounded by fluorine atoms bound to the carbon by strong links. These chains are difficult to break by chemical or thermal action. The polymer has a high molecular weight, including long molecules comprising from 10,000 to 100,000 building blocks. Intermolecular forces are relatively low, in comparison with the strong intermolecular strength.

The properties of fluoroplastics include chemical inertness. Fluoroplastics resist the attack of nearly all chemicals, regardless of temperature. They are stable over a wide range of temperatures — from cryogenic temperatures below −425° F. to as high as 500° F. They have about the lowest coefficient of friction for any known solid. In summary, these materials have no-stick characteristics, excellent abrasion resistance, resistance to nuclear radiation and ultra-violet rays, good electrical properties, with a low dielectric constant and dissipation factor regardless of temperature and frequency, very low permeability to moisture and vapor, practically no moisture absorption, and high resistance to weather and ozone. A part molded from these fluoroplastic materials contracts about 2% when cooled to −300° F., and expands about 4% when heated from room temperature to 500° F. The TFE fluoroplastics do not melt, but they change into a gel at temperatures above 621° F. Therefore, it is desirable to use special methods somewhat similar to powder metallurgy, during manufacturing with them.

Because of its chemical inertness and low energy surface, standard FEP-fluorocarbon materials cannot usually or conveniently be bonded to substrates with conventional adhesives. However, these materials can be heat bonded to themselves and to many other materials without adhesives. They may also be molded or compressed into a superior bonding.

As a scuff coat flame protective device, one of the most desirable characteristics of the mixture of silicone and TFE, FEP (or the equivalent), large volume coating 23 of flame protective material, resides in its ablative characteristics, which cools the tube. If there should be a fire in an area adjacent the hose 20, the coating material 23 does not burn, but experiences slow degradation of particles which carry off the surface heat.

Since coating 23 is relatively thick and heat insulating, the fire may burn for a substantial length of time before the fluid inside tube 21 is subjected to the temperature of the flame or the surroundings. In most modern aircraft, automatic flame extinguishing equipment will extinguish the fire long before tube 21 is so subject to flame temperatures. Furthermore, if the primary tubing 21 which carries the fluid is ruptured, the volume coating or tubing 23 will act as a carrier layer or a supplmentary carrier for the fluid so as to allow a time element for the immediate shutdown or rerouting of the fluid system.

The optional scuff jacket 24 may also be performed in place, or it may be fitted over the performed scuff coat, flame protective coating 23. This scuff jacket 24 provides a high degree of abrasion or wear resistance and flexibility. For critical characterisics, the scuff jacket 24 uses materials equal to or exceeding the desired characteristics of the extruded scuff coat, flame protective coating. A silicone or "Teflon" material is preferred for this scuff jacket 24 so that the temperature rating of the hose is not limited by the coat. A TFE or FEP mixture may also be used with larger particles of about .020 to .040 inch in diameter when extra heavy thickness is preferred for greater fire protection.

If the hose is made with different color strata, any abrasion damage to the hose is visually apparent, especially if the abraded material is reflective or fluorescent. A number of considerations apply to this coloring process. In greater detail, the inventive material tends to throw off particles of TFE or FEP as it is subjected to mechanical wear. These particles are electrostatic. Thus, they tend to cling to adjacent surfaces where they are visible. If aluminum dust, for example, is mixed into the particles, they are light reflective. If a fluorescent material is so mixed, the particles are fluorescent under ultra-violet light.

Thus, if a light is directed into the inside of a wing of an aircraft, for example, the particles will reflect or glow. It is not necessary to even see the hose in order to know that abrasion has occurred.

The colorant requirements are such that they should also have excellent heat stability, acid and alkali resistance, and dispersibility. The colorants must be stable at fabricating temperatures, which range up to 750° F. Colorants for use in polychlorotrifluoroethylene (CTFE) resins must be relatively non-reactive with the polymer. Pigments must be of small particle size for use in the fluorocarbons.

More particularly, it has been found that fluorocarbons may be suitably colored by the following pigments: ceramic black, chrome - cobalt - alumina, ceramic yellow, titanium pigments, cadmium sulfide, chrome - tin, cadmium mercury, cadmium sulfo-selenide, phthalocyanine, and nickel - azo. Silicone molding compounds may be colored by the following pigments: iron oxide, ceramic black, ultramarine blue, chrome - cobalt - alumina, ceramic yellow, titanium pigments, chrome - tin, cadmium mercury and cadmium sulfo-selenide.

EXAMPLE 1 — EXTRUSION PROCESS

One performing process used to apply the extruded scuff coat, flame protective coating 23 employs an extrusion machine, as shown in FIGS. 2 and 3. In greater detail, this machine comprises a drive means 30, a plastic transport mechanism 31, a feed hopper 32, and an extrusion die 33. The drive means 30 comprises a motor 35, a gear reducer 36, and a flexible coupling 37. The plastic transport mechanism includes a thrust bearing 38, a heated barrel 39 controlled by a plurality of thermocouple sensors 40, and a feed screw 41. The hopper 32 receives the plastic which is fed into the screw and transported by the screw to the extrusion die 33. At the extrusion die, there is a screen pack 43, a heater 44, and a thermocouple 45.

The general principles of a cross-head extrusion die are seen in FIG. 3. Cross-head dies are used for coating and jacketing operations. In coating, the tubing 21, 22 is introduced into the rear 48 of the cross-head and passes through the mandrel 49 and guider tip 50. The inventive material melt 51 is extruded around the tubing 21, 22 as it emerges from the guider tip 50. Channel space in the head is kept to a minimum to avoid hang-up areas and to insure uniform melt pressure distribution around the coating. The melt is applied inside the die or extrusion head while still under extruder pressure. Thus, a prefabricated combination of hose 21 and metal braid 22 is drawn through the head 47. The feed screw 41 delivers to head 47, the mixture 51 of silicone and the TFE and FEP granules. As the hose and braid combination are drawn in direction A through head 47, the scuff coat, flame protective coating 23 is extruded directly thereon, with bonding into the interstices of the braid.

One mixture actually made by this extrusion process included the following constituents:

Materials for Fabrication — The base polymer used is:

G.E. SE4527 silicone rubber
Sintered Teflon powder, Repro No. 3.010, nominal diameter particles
Virgin Teflon.

The following compositions were prepared:
25% sintered Teflon — 75% SE4527
50% sintered Teflon — 50% SE4527.
(This represents a maximum saturation of sintered powder only.)

Additions of virgin powdered Teflon aided in the preparation of the following:
1. 50% sintered Teflon powder — 2% virgin Teflon powder — 48% SE4527
2. 50% sintered Teflon powder — 4% virgin Teflon powder — 46% SE4527
3. 60% sintered Teflon powder — 1% virgin Teflon powder — 39% SE4527.

(The 50% – 4% – 46% and the 60% – 1% – 39% are maximum saturation levels that can still be processed.)

All the TFE - SE4527 compositions were prepared on a standard roll type rubber mill. Both sintered TFE and virgin TFE were added in small increments to fully plasticized rubber on the mill until desired compositions were achieved. Compositions were calendered to those thicknesses that facilitated ease of handling.

Using a screw type extruder, strips of uncured compounds were extruded. These strips were used for molding and hot air vulcanization evaluations.

Physical property tests for tensile elongation and abrasion were performed on extruded strip stock and molded abrasion buttons, on all compositions plus G.E. SE5701 silicone rubber. Abrasion tests were also performed on molded neoprene and Teflon buttons.

From the above tests, the 60% TFE – 1% virgin TFE – 39% SE4527 was selected for further evaluation.

EXAMPLE 2 — EXTRUSION PROCESS

An alternative extruder is seen in FIG. 9, which is particularly desirable when a multi-strata color is desired. Here the extruder comprises a cylinder 52 terminated at one end in a die 53 and at the other end by an extrusion ram 54. Inside the cylinder 52 is a mandrel 49a for separating the core or tube 21a from the running plastic inside the cylinder. The ram 54 is an annular shape to fit snugly over the mandrel 49a and to bear against plastic inside the cylinder 52.

A billet 55 of plastic is placed inside the cylinder 52. As the ram 54 is pressed in direction B, the plastic of billet 55 is squeezed and caused to flow through the reduced die 53. The plastic is extruded on and surrounds the core or tube 21a which is drawn through the ram 54, cylinder 52, and die 53, thereby forming the scuff coat, flame protective coating 23 around the core or tube 21a.

A ram die, such as this causes a laminar flow of plastic whereby the cross section of the billet is accurately preserved, in reduced scale, in the extrusion 23. Thus, if the billet has two colors, as at 55, 56, the extrusion will also have two colors (as seen in FIG. 10). Likewise, a scuff coat, flame protective coating 23 of any suitable number of colored strata may be formed around the core or tube 21a. Therefore, if the abrasion wears through the outside color 55, the distinctively colored center 56 is seen. In one embodiment, the pigment of strata 56 was electrically conductive material to provide for grounding the hose.

Accordingly, FIG. 9 shows means for simultaneously extruding around a core, a scuff coat, flame protective coating 23 of any suitable number of differently colored strata. This type of extruder may also be used to compress the inventive material.

A material and mixing method used in this preforming process are the same as that set forth above in Example 1.

Using the 60% – 1% – 39% composition to make a billet, extrusions were made on a hydraulic ram type extruder. The extrusions were in the form of solid rod and tube.

An extrusion was also made on the ram type extruder and consisted of a multiple layer construction. This new construction was fabricated as follows:

A portion of the 60% – 1% – 39% was mixed with 2% carbon black. This new black mixture was then placed on a preform mandrel and overwrapped with a standard 60% – 1% – 39% material. Preform of this type allowed the multi-layer extrusion.

If the opening in the die of either FIGS. 3 or 9 does not correspond to the desired finished cross section, it may be necessary, or simpler, to produce the desired finished cross section by a post-extrusion forming of the extrudate, after it has left the die. This final forming may involve a molding drawdown, pressure, compression or a similar machining procedure. Sometimes the extruded coating 23 is exposed to air prior to the addition of a scuff jacket 24, if desired, since oxidation improves adhesion with some materials. Also, the surface tension of the melt relative to the surface tension of the substrate under contact conditions may affect the bond. A clean substrate surface will promote adhesion.

Room temperature vulcanizing silicone rubbers cure by two mechanisms. Some use a catalyst mixed with the compound before use. Others cure in place upon exposure to atmospheric moisture. The former type is available in a variety of compounds differing in the characteristics of the compound itself and in the properties of the elastomer obtained after curing. These compounds range in viscosity from readily pourable liquids to spreadable pastes. The time interval between catalyst addition and the onset of elastic character may be varied from a few minutes to several hours. Other materials are cured according to the characteristics of the particular constituents thereof.

Other plastics which are likely to be used cure at high temperatures, such as 700° F. However, such high temperatures are likely to damage the material of the tube 21. This damage does not occur with the inventive material, however, since coating 23 protects the tube 21, as it does during a fire.

Other embodiments of the invention do not extrude the scuff coat, flame protective coating 23 directly upon the tubing 21 or braid 22. Rather, the coating 23 is first preformed into an intermediate ribbon or tape product which is thereafter wound upon the braid, and then heat bonded to itself. In greater detail, a flat film can be produced in any width up to about 72 inches, more or less. Generally, the lower limit on widths available is determined by the economics of the process, since too narrow a width sometimes involves too low a preformer output. Therefore, narrow widths may be slit from wider rolls. Here also, the tape may be preformed in two colors to provide a display of abrasion damage.

Preforming may also be used for the production of continuous lengths of thermoplastic materials having a constant geometrical cross-section. If the tape has a rectangular cross-section, it may be wound directly around the braid 22, as shown in FIG. 4. As shown in FIGS. 5 and 6, the mixture may also be a preformed tape or ribbon with a step-like configuration. As the tape is wound around the braid 22, the complementary steps come together to form a substantially continuous outer surface, as seen in FIGS. 5 and 6. For these embodiments, the preformed tape may be heat treated prior to wrapping to give it a permanent helix so that it may thereafter be wrapped directly on the braid 22 with greater ease.

With any of the embodiments, a corrugated outer covering or jacket 58 (FIG. 7) may be added to give a greater resistance to abrasion damage.

The advantages of the invention should now be clear. The hose may be made in a plurality of colored strata to show wear, and the particles given off as a result of wear are visually apparent even when the hose is not seen. The colored strata may be preformed simultaneously in a single extrusion or sequentially by successive extrusions. Alternately, the strata may be separate tubes which are brought together in a plurality of steps. The mixture of silicone (or the equivalent) and TFE, FEP (or the equivalent) is 10 times more wear resistant than silicone, per se. The slick abrasion resistant, non-stick outer coating is ideal for fishing the hose through small, hard to reach spaces, as in an aircraft wing.

To secure the hose in place, or to hang it from a structure, a metal clamp (FIG. 8) is preferably used. Here, this particular clamp is adapted to hold two hoses in side-by-side relationship. However, it should be understood that any other suitable clamp or similar device may also be formed.

In greater detail, a metal strap 60 is preformed with two bights to surround each of two hoses 20 in side-by-side relationship. A cushion of the inventive material is preformed as a tube 61, preferably with a rectangular cross-section. This tube slips over and fits around the metal strap 60 of the clamp. Thus, the clamp is cushioned in the bight area to hold the hoses 20, wire assembly, or the like in place, without deforming or chafing them. Since the cushion 61 and the scuff coat, flame protective hose extrusion 23 are the same materials, and further, since the scuff jacket 24 (if used) is compatible with this material, neither the hose 20 nor the cushion 61 will damage the other.

The clamp of FIG. 8 is maade made two discrete members, strap 60 and cushion tube 61. Another embodiment vulcanizes and bonds the cushion to the strap blank in order to provide a single and effectively integral part, according to the teachings of FIGS. 11–17.

In greater detail, the process begins with an integral sheet 80 of the inventive material, prepared as taught above. The sheet is cut into strips along a line 81 calculated to give a series of cushions, each having a predetermined width 82.

A number of blank metal straps 83 are stamped or otherwise formed out of any suitable material, such as stainless steel, for example. Suitable holes or other connectors 84, 85 are formed in the strap to provide means for attaching the clamp to an adjoining structure, as by means of a nut and bolt. All corners and any sharp edges are rounded and deburred. This may be done by tumbling or sand blasting, for example, or in any other suitable manner. The length of the strap is such that it projects a suitable distance beyond either side of a width 86 equal to the cushion width 82.

Next, the metal strap is cleaned and coated with a suitable pre-vulcanizing adhesive such as Chemlok 608. A suitable number of blank metal straps 83 are laid side-by-side, in a spaced parallel relationship, on the strip 87. The strip is then placed in the bottom of a rectangular sheet mold 90, here depicted by dot-dashed lines. Heat and pressure are applied over the assembly to vulcanize, preform, and bond the blank straps 83 to the inventive material 87.

The vulcanized strip 87 is removed from the mold 90 and subjected to a post-cure treatment. Thereafter, the strip 82 is cut into discrete members, with one clamp strap and one cushion for each member. The excess poly-polymer material is trimmed away from the metal strap, thereby leaving a strap with a cushion 88 vulcanized and bonded thereto.

A tip 91 (FIG. 13) is bent at a right angle along a line 92 near one end of each strap 83. The strap 83 is then wrapped around a post 93 to form a bight 94 terminating in two tabs 95, 96 with the holes 84, 85 in alignment. A hose, wiring assembly, or the like may be fitted into the bight 94, and the clamp may be attached to an adjacent structure, as by means of a bolt passing through the holes 84, 85, for example.

Figure 13:
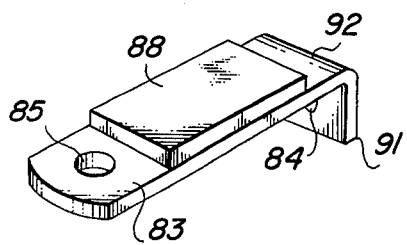
FIG. 13 shows a third step in the manufacturing process wherein each metal clamp is severed, trimmed, and preformed to assume an initial shape.
Figure 14:
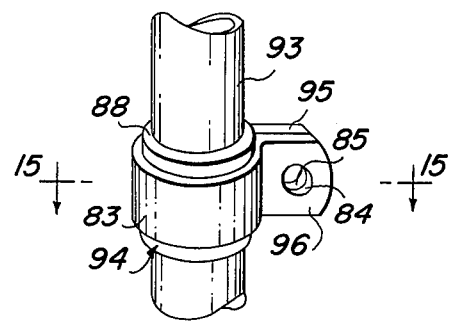
FIG. 14 shows a fourth step in the manufacturing process wherein the clamp is formed into the final shape of a hose clamp.
Figure 15:
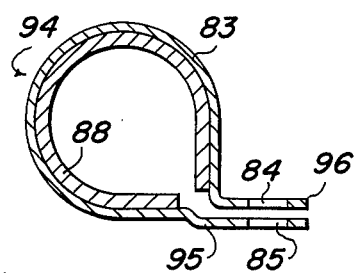
FIG. 15 is a cross-sectional view taken along line 15—15 of FIG. 14 showing the clamp made in the step of FIG. 14.
Figure 16:
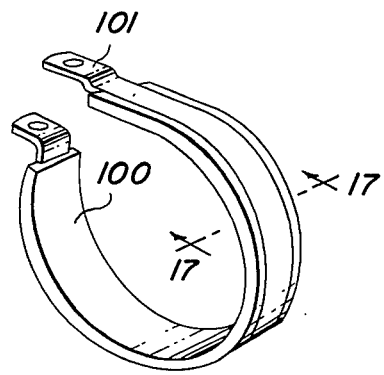
FIG. 16 is a perspective view of a second embodiment of a hose clamp having a preformed cushion secured thereto.

A different manufacturing process begins with a coil or strip of metal stock which is sand blasted and coated with adhesive. The strip is preferably blanked and formed on a progressive die, with automatic feed. At the end of this forming step, the blank has an L shape, somewhat as shown in FIG. 13.

Figure 17:
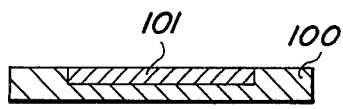
FIG. 17 is a cross-sectional view of the clamp taken along line 17—17 of FIG. 16.

A cushion of the poly-polymer material is preformed into a cushion 100 having a cross-section as shown in FIG. 17. The cushion contains a cavity which snugly receives a metal blank 101, fitting over three sides of it. Then, a number of the blanks with cushions attached thereto are fitted into a mold having a plurality of cavities, with one blank per cavity. A pressure and heat treatment vulcanizes and bonds the cushions 100 to the straps 101.

The blanks are post-cured, deflashed and deburred by tumbling. The blanks are then finished by an automatic rotary actuator.

Still other uses of the inventive material will readily occur to those who are skilled in the art. For example, when the granules are further reduced to about 0.001 to 0.002 inch in diameter and embedded in various elastomeric polymers at concentrations of about 10% to 50% by weight, the resulting aggregate material has a self-lubricating characteristic. Electrically conductive material of a relatively fine particle size, in the order of 10–80 millimicrons, may be mixed into the inventive material. This conductive material should be chemically inert to anything likely to be used on or near the material. Also, it is obvious that the electrically conductive material must be compatible with silicone, TFE, and FEP. In particular, care should be taken to use an electrically conductive material (such as acetylene or carbon black) which is not damaged by curing temperatures that are likely to be encountered.

Figure 18:
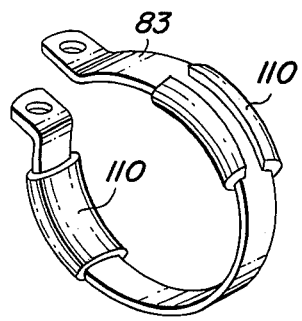
FIG. 18 is a schematic representation of a clamp strap with a metal cushion spot welded thereon prior to attachment of the poly-polymer material.

Another modification (FIG. 18) involves a multi-metal part wherein at least one smoothed and rounded stainless steel cushion 110 is spot welded to the blank strap 83 before the poly-polymer material (not shown in FIG. 18) is bonded to the metal cushion. The metal cushion 110 remains attached to the strap 83 in case of fire or other extreme temperature, while the poly-polymer material burns off. Thus, the smoothed edges of the stainless cushion 110 provides a fail safe non-chaffing cushion.

In yet another modification of the invention, a milled fiberglass filler may be mixed with the poly-polymer base during the original manufacture thereof. This filler adds strength, hardness, and other properties which may be desirable in certain applications.

Still other modifications may benefit from use of nitrile or EPDM rubber in addition to or in place of the rubber materials described above.

The need for an application of these and other modifications will be apparent to those skilled in the art. Also, the various modifications described above in connection with the hose may be applied to the clamp so as to disclose wear and abrasion, for example.

Since still other modifications may be made without departing from the scope and spirit of the invention, the appended claims are to be construed to cover all equivalent structures, processes, and materials.

We claim:

1. A cushioned abrasion resistant device comprising a metal strap shaped to have at least one bight, a scuff resistant cushion formed in at least the inside of the bight area of the strap, said scuff cushion comprising an ablative covering of a large volume of flame protective material which experiences a slow degradation of particles which carry off surface heat when subjected to flame, and said scuff cushion further comprising an admixture of a silicone-type polymer mixed with granulated sintered particles from the class of polytetrafluoroethylene and related fluoroplastic materials, said particles having diameters in the general order of 0.001 inch to 0.015 inch, and said admixture of silicone polymer and particles being proportioned in the range of 25% to 75% by weight.

2. The device of claim 1 wherein said cushion comprises a low stick or slippery surface characterized by chemical inertness, flame resistance, high ablative characteristics, high dielectric properties, flexibility over a wide temperature range, a high strength-to-weight ratio, toughness, structural strength, and low permeability to moisture and vapors.

3. The device of claim 1 and a metal cushion integrally attached to said strap and interposed between said scuff resistant cushion and said strap.

4. The device of claim 1 wherein said mixture of silicone-type material and particles is preformed in tubular form with a rectangular cross-section shaped and dimensioned to fit over said metal strap.

5. The device of claim 1 wherein said mixture of silicon-type material and particles is preformed into a sheet of material which may be cut to form said cushion, and means whereby said cushion is bonded and vulcanized to the strap in the bight area.

6. The device of claim 1 wherein said strap has an L-shaped bend on one end of the bight, said L shape having a long end and a short end, the long end of the L-shaped strap being brought around to become parallel with the short end of said L, with the bight lying circularly between the ends to receive and support an object.

7. The device of claim 1 wherein said clamp is shaped and proportioned to provide a plurality of bights for holding a plurality of hoses in a spaced parallel side-by-side relationship.

8. The clamp of claim 1 wherein said cushion is vulcanized and bonded to said metal strap.

9. A hose clamp for a high performance aircraft comprising a metal strap formed into at least one bight with attachment means associated therewith, a cushion comprising an aggregate admixture of a base from the class of silicone polymer rubber or $VF_2$ mixed with granulated sintered material in the class of TFE, FEP, or CTFE, the mixture forming a cushion which fits onto and is vulcanized and bonded to the strap in the bight area to protect said hose.

10. The clamp of claim 9 wherein the mixture includes a milled fiberglass filler material.

11. The clamp of claim 9 and a metal cushion attached to said strap inside the bight, the mixture being bonded to said metal cushion.

12. The clamp of claim 9 wherein said mixture is a preformed tube having a cross-section which is complementary to the cross-section of said strap, said tube fitting over said strap in said bight area.

13. The clamp of claim 9 wherein said material mixture comprises an elastomer base having properties wherein it (1) has a thermal and oxidative stability at high temperatures, especially at 500° F. and above; (2) is flexible at temperatures below −100° F.; (3) has excellent electrical insulation properties including resistance corona breakdown; (4) has general inertness and resistance to weathering, ozone and chemicals; (5) is non-corrosive toward other materials; (6) is non-flammable and self-extinguishing in case a fire should start; and (7) has surface properties which prevent other materials from sticking thereto, and a granulated particle filler material having properties wherein it (1) has chemical inertness; (2) resists the attack of chemicals; (3) is stable over a wide range of temperatures from below −425° F. to at least 500° F.; (4) has a low coefficient of friction; (5) as a low dielectric constant and dissipation factor regardless of temperature and frequency; (6) has a low permeability to moisture and vapor with practically no moisture absorption; and (7) has high resistance to weather.

14. The clamp of claim 9 wherein the granulated material has particles in the general order of 0.001 inch to 0.015 inch in diameter, and the base and filler material are mixed in the range of 25% to 75% by weight.

15. The clamp of claim 9 wherein a plurality of said bights are positioned to hold a plurality of said hoses in a side-by-side relationship.

16. The clamp of claim 9 wherein said cushion is preformed to have a cross-section which fits over at least three sides of said metal strap.

17. A process of making a clamp comprising the steps of:
 a. forming a sheet of poly-polymeric material including sintered material in the class of TFE;
 b. forming and smoothing a plurality of blank metal straps;
 c. vulcanizing and bonding said straps onto said sheet of poly-polymeric material;
 d. separating said sheet into discrete elements; and
 e. forming said discrete elements into base clamps shaped and proportioned to secure hoses or the like in place.

18. The process of claim 17 wherein step (a) comprises the additional step of preforming said material to fit over and at least partially around said strap blanks.

19. The process of claim 17 wherein step (c) includes the additional step of cleaning and coating said strap blank with a pre-vulcanizing adhesive.

20. The process of claim 17 wherein step (e) comprises the step of bending an end of said strap blank to form an L shape with a long end and a short end, and wrapping said long end of the L shape around a former to make a bight with said poly-polymeric material forming a cushion inside said bight.

21. The process of claim 17 wherein step (b) comprises the steps of forming a strap of metal on a progressive die, and sand blasting or tumbling the strap metal blanks.

* * * * *